United States Patent [19]
Tight, Jr. et al.

[11] Patent Number: 4,885,194
[45] Date of Patent: Dec. 5, 1989

[54] RE-ENTERABLE CLOSURE ASSEMBLY

[75] Inventors: Dexter C. Tight, Jr., Palo Alto; Marc F. Moisson, Los Altos, both of Calif.

[73] Assignee: Raychem Corporation, Menlo Park, Calif.

[21] Appl. No.: 341,407

[22] Filed: Jan. 21, 1982

[51] Int. Cl.⁴ .................................................. B32B 1/08
[52] U.S. Cl. ....................... 428/34.9; 156/52; 156/86; 174/DIG. 8; 428/43; 428/913; 428/35.8; 428/35.9; 428/36.91
[58] Field of Search ................ 156/52, 86; 174/84 R, 174/86, DIG. 8; 428/36, 43, 913, 34.9, 35.8, 35.9, 36.91

[56] References Cited

U.S. PATENT DOCUMENTS

| | | |
|---|---|---|
| 3,597,372 | 3/1971 | Cook . |
| 3,957,372 | 5/1976 | Jowett et al. ........................... 356/51 |
| 4,029,895 | 6/1977 | Scarborough . |
| 4,142,592 | 3/1979 | Brusselmans . |
| 4,287,012 | 9/1981 | Midgley et al. ................... 428/43 X |
| 4,380,686 | 4/1983 | Moisson ........................... 428/464 X |

FOREIGN PATENT DOCUMENTS

| | | |
|---|---|---|
| 1260583 | 2/1968 | Fed. Rep. of Germany . |
| WO79001 | 3/1979 | PCT Int'l Appl. . |
| WO800253 | 11/1980 | PCT Int'l Appl. . |
| 1431167 | 4/1976 | United Kingdom . |
| 2024714 | 1/1980 | United Kingdom . |
| 2035203 | 6/1980 | United Kingdom . |
| 2039785 | 8/1980 | United Kingdom . |
| 2048167 | 12/1980 | United Kingdom . |
| 2059873 | 4/1981 | United Kingdom . |
| 1589547 | 5/1981 | United Kingdom . |
| 2069773 | 8/1981 | United Kingdom . |

Primary Examiner—Robert A. Dawson
Attorney, Agent, or Firm—A. Stephen Zavell; Herbert G. Burkard

[57] ABSTRACT

A re-enterable closure assembly for enclosing an elongate substrate such as a telephone or power cable, has an outer sleeve, preferably heat recoverable, and an inner liner to protect the cable against heat and mechanical damage. The liner has two major parts, a support and a disposable layer, thus allowing the outer sleeve to be removed, for repair etc, without damaging the liner. This could not easily be acheived in a one piece liner since a bond generally must be formed between the liner and the outer sleeve to prevent wicking of moisture vapour.

14 Claims, 4 Drawing Sheets

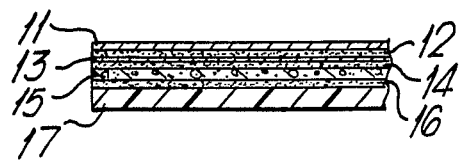
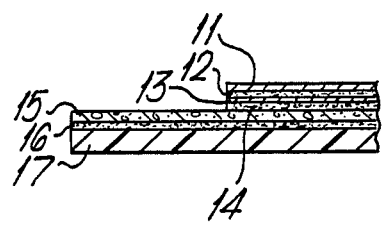
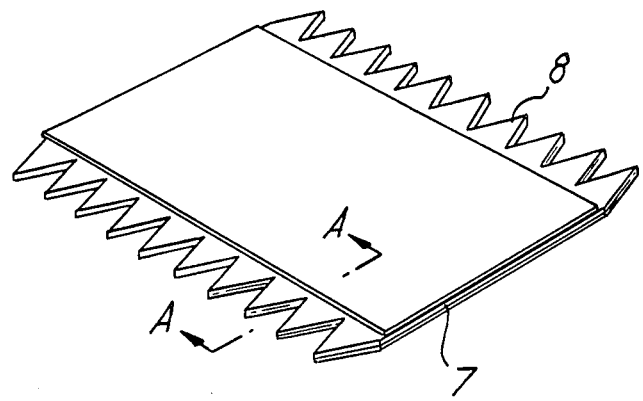
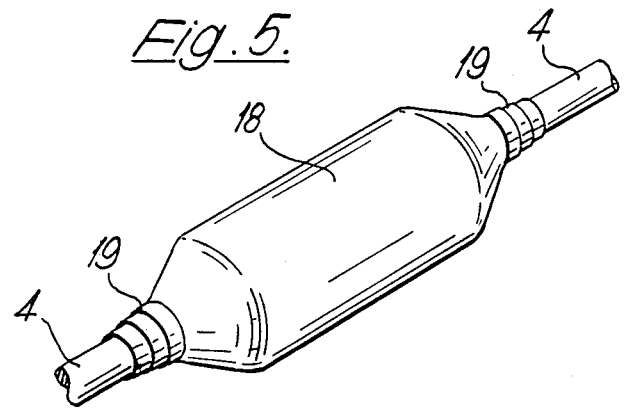

RE-ENTERABLE CLOSURE ASSEMBLY

This invention relates to a closure assembly, especially one suitable for use in the protection, splicing or insulation of supply lines such as electric cables, particularly for the telecommunications or power industries.

Closure assemblies, especially ones having a shrinkable outer sleeve, are now widely used in many areas where insulation, sealing or encapsulation are required. Usually these sleeves recover, on heating or other treatment, towards an original shape from which they have previously been deformed, but we are also concerned with sleeves which adopt new configurations, even if they have not been previously deformed.

Sleeves which shrink under the direct action of heat may be made from a polymeric material exhibiting the property of elastic or plastic memory as described, for example, in U.S. Pat. Nos. 2,027,962; 3,086,242 and 3,597,372. In a variation of this idea, as described, for example, in British Patent 1,440,524, an elastomeric member such as an outer tubular member is held in a stretched state by a second member, such as an inner tubular hold-out member, which, upon heating weakens and thus allows the elastomeric member to recover. In addition to tubular sleeves, wrap-around sleeves have also been developed e.g. as described in U.S. Pat. No. 3,379,218 and British Patents 1,155,470; 1,211,988 and 1,346,479. Alternatively, the sheet may be held in the wrapped-up configuration during recovery by means of an adhesive which may, in some cases, be applied on site. The disclosures of these patents and other patents and applications mentioned in this specification, are incorporated herein by reference.

One particular area of application of articles of the type described above is in the insulation and protection of junctions between supply lines, especially electric cables. In making such junctions, for example, between telephone or power cables, many problems arise in meeting the necessary requirements of continuity of insulation and earthing, of sealing the joint against the ingress of contaminants such as moisture and insects and in providing the necessary strength of resistance to tension, compression, flexing and impact.

British Patent 1,431,167 (and its equivalent U.S. Pat. No. 4,142,592) discloses one type of sealing system, namely a heat-shrinkable sleeve, which may be a wrap-around sleeve, provided with a central reinforcement comprising a relatively rigid longitudinally split tube. Typically such a tube is made from a pair of semi-cylindrical half shells, for example made from aluminium.

This closure assembly has the advantage that it may easily be re-opened for repair work or modification of a cable joint, but support means are required to keep the split tube in its correct orientation and this and other factors make the assembly rather expensive.

An alternative idea, which is disclosed and claimed in U.S. Pat. No. 4,289,553 is the use of an inner liner comprising a continuous thin metal foil provided with central reinforcing means comprising one or more longitudinally compressible coils. The assembly is re-enterable since the heat-shrinkable sleeve can be cut and removed and the coil(s) can be longitudinally compressed so as to allow access to the joint. Once repair or modification has been effected the coil(s) can return to their former configuration. However, because of the coil arrangement the use of a knife to cut the heat-recoverable sleeve/metal foil laminate is rather difficult since there is no continuous surface to support the tip of the knife. Also, this assembly tends to lack longitudinal strength.

In Gebrauchsmuster 7805026 there is described an assembly having an insert formed from a roll of stiff moisture proof material having an internal aluminium foil liner. This foil does not act properly as a moisture-vapour barrier since capillary transfer can act along the outer surface of the liner and water can pass around the foil at its ends.

UK patent publication 2059873 (and its equivalent U.S. Pat. No. 4,380,686) discloses a liner which is a laminate of the following layers, starting from the outer surface: Al foil, MYLAR polyester (Reg. T.M.), first pressboard, second pressboard, microporous MYLAR, and wax coating. Here bonding of the aluminium foil to the outer sleeve to prevent capillary transfer results in an assembly which is not re-enterable because the foil is an integral part of the liner.

The difficulty or impossibility of re-entering the closure assembly without destroying all of its components can be a considerable disadvantage, especially when the assembly contains an expensive liner. Liners can be complex structures giving the splice case a pleasing appearance and having the functions of support, acting as a barrier to heat, preventing the ingress of moisture and improving mechanical strength thus providing resistance to impact, static load and thermal cycling under pressure; as a result they can often be the most expensive component of an assembly, and thus are desirably re-usable.

We have now designed a closure assembly which can employ a liner having excellent strength, moisture impermeability and heat-resistance, and which is reusable. This is achieved by providing in the assembly a layer which can be bonded to the inner surface of the sleeve to prevent wicking but which is removable from the remainder of the liner. The new system is particularly useful in conjunction with recoverable, especially heat-recoverable, sleeves. However, it is envisaged that it will be useful in other closure systems such as non-recoverable sleeves and rigid moulds for potting compounds etc.

The invention therefore provides a liner suitable for supporting a sleeve in a closure assembly, which in use comprises a laminate of:
  (A) a re-usable support; and
  (B) a disposable outer layer held in position with respect to the support such that it is separable therefrom without damage to the support.

The support is preferably a substantially rigid sheet material such as cardboard, or a thermoplastics material such as polypropylene especially calcium carbonate filled polypropylene or calcium carbonate filled copolymer of propylene and ethylene. The outer layer of the liner may also act as reinforcement for the sleeve.

The support may also include a heat barrier layer to ensure that strength is maintained during any heat treatment likely to be encountered during installation or use. Resistance to heat applied for heat recovery of any sleeve or for activation of any heat activatable adhesive will be the most likely concern. Examples of heat barriers include foamed polymeric materials, such as closed cell polyethylene foam.

The invention also provides a re-enterable closure assembly for covering an elongate substrate, which comprises:
  (A) a sleeve, (B) a liner comprising a laminate of a re-usable support, and a disposable outer layer held in position with respect to the support such that it is separable therefrom without damage to the support;
(C) a moisture vapour barrier; and
(D) means for affixing the moisture vapour barrier to an inner surface of the outer sleeve.

The invention still further provides a method of enclosing an elongate substrate, which comprises:
(A) installing around the substrate a liner comprising a laminate of a re-usable support and a disposable outer layer held in position with respect to the support such that it is separable therefrom without damage to the support, and incorporating a moisture vapour barrier;
(B) installing around said liner a sleeve and bonding the ends of the sleeve to the substrate; and
(C) causing the moisture vapour barrier to affix to an inner surface of the sleeve.

The closure assembly may be provided with self-contained cutting means arranged to cut open the assembly after recovery of the sleeve to permit re-entry. Piano wire is suitable, for example as described in our U.K. Patent 1604380.

The invention is applicable to a wide range of outer sleeves, liners and foils. What is important is that the sleeve can be removed leaving a major part of the liner intact. The bonding of this layer to the sleeve effectively reduces the surface area of the sleeve available for moisture-vapour transmission since wicking inside the sleeve is prevented, and the lack of permanent bond within the components of the liner means that the sleeve can be cut or otherwise opened without completely destroying the liner. The layer that is bonded to the sleeve is preferably a moisture vapour barrier (such as aluminium foil), but such a barrier could be bonded to the sleeve indirectly. Similarly this layer is preferably the disposable outer layer of the liner, but the two layers could be separate entities.

With a knowledge of this invention, the skilled man would be able to select suitable means to prevent bonding between the sleeve and the part of the liner (the support) which is desirably saved. Examples of ways of doing this include: the provision of a second layer of foil between the first mentioned layer and the support; ensuring that there is no adhesive or mastic between the support and the sleeve, or that such materials are weak or can decompose with temperature or with time; the provision of a release agent, such as Telfon® or a silicone based polymeric composition, or of a release paper or foil between the foil and the support; the use of the low cohesion material as one layer of the liner; and enclosing the part of the liner to be retained in a disposable bag. In the penultimate of these methods the cohesion referred to will be strong enough to hold the foil in place during manufacture and installation of the assembly, but weak enough to allow re-entry. In such a case the liner will of course lose some of its thickness on re-entry, but will not be deformed or disturbed and will be capable of being rebuilt. The last mentioned method, enclosing a support in a bag, has many advantages, especially ease of re-entry and re-assembly. When the outer sleeve is removed, the bag will generally be damaged, but the support can be removed intact. The support is then simply placed in a new bag, and a new sleeve recovered around the repaired splice. The support can be placed in a bag first, and the combination then installed around the splice; or alternatively the fabrication of the bag can be carried out simultaneously with the installation. The materials of the bag can provide a moisture vapour barrier and as additional heat protection and strength. Furthermore, a substantially closed bag prevents sealant on the inner surface of the sleeve penetrating between the crowned ends of the inner liner where such a design is used. The bag need not be closed, and need not in fact be closed along even three edges since folding of sheet material around the support may be sufficient. Any of the above methods may be used singly, or two or more compatible methods may be combined.

Prior to use it is not necessary that the outer layer of the liner be bonded to the outer sleeve. The sleeve can be coated with a hot-melt adhesive on its inner surface, which melts during heat-recovery to cause bonding between said layer and the sleeve, alternatively the layer can be coated with adhesive. The layer can have a wide range of thickness, and where it is a metal foil 10–30, especially 12–25, microns is preferred. Thinner foils can be used if a particularly smooth surface of the foil after recovery is desired and if it is desired that the foil be bonded to the sleeve before recovery. In such a case the foil appears to the eye to remain perfectly smooth and continuous but in fact is caused to crumple on a very minute scale—see our U.S. Pat. No. 4,289,553. The foil need not be a metal, but when it is aluminum is preferred.

Although the invention can be used with many kinds of liners, it is obviously of primary interest in connection with more complex liners, which one would prefer not to destroy when the assembly is opened. As an example, the invention may be used with the liner disclosed in our UK Patent Publication 2069773. In contrast to the more usual liners based on cardboard or other non-woven cellulosic materials, this publicatin discloses liners comprising an internal thermoplastic support layer, an external heat barrier layer, and optionally a moisture barrier layer. The layers may be bonded together to form a laminate, or may be supplied separately. The heat barrier layer is preferably a closed cell foamed polymeric material such as a neoprene or polyolefin foam and the thermoplastic support layer is preferably polyethylene or polypropylene, especially calciumcarbonate filled polypropylene. Each end of the liner may taper gradually to the diameter of the substrate which it surrounds, the advantage of this is that good seals can be provided at the ends of the liner. Such tapered ends are preferably produced by providing crowns or longitudinal slits into the ends of the liner, which allow the ends of the liner to close down into cone shapes. The slits preferably extend only through the support layer and not through any other layer of the liner, since a better moisture barrier is thereby achieved. Where the invention employs a bag around the liner proper, the slits may of course extend through the entire thickness of the liner. The liner can if desired contain no layer which allows capillary transfer of liquid along its surface, since transfer could allow liquid to by-pass via the ends of the liner any moisture-barrier layer that may be provided. Again, this feature is not necessary where the bag is employed, since the bag can be water impermeable. These last two considerations, in fact, highlight advantages of the use of the bag.

Another type of liner is described in our UK Patent 2059873; this liner is a laminate of the following layers starting from the outer surface: Al-foil, MYLAR polyester (T.M.) first pressboard, second pressboard, microporous MYLAR, and wax coating.

In general, it is essential to provide a liner with an outer moisture barrier layer to resist ingress of moisture which would cause delamination of the liner, or which would cause damage to the cable splice or other substrate. In order to prevent capillary transfer of liquid along the liner it is desirable that the moisture barrier layer be bonded to the sleeve once the assembly has been installed. As mentioned above, this can be achieved by providing a hot-melt adhesive on the inner surface of the sleeve or on the outer surface of the barrier layer, which melts for example, when the sleeve is heat recovered. This adhesive liner bonds the outer surface of the liner to the sleeve. An unfortunate result is that the assembly is not easily re-enterable. it is this problem which the present invention can overcome.

The invention is further illustrated, by way of example, and by way of comparison by the accompanying drawings in which:

FIGS. 3A and 3B show the use of a release paper or plastic;

FIGS. 4A and 4B show the use of an incomplete layer of aluminium foil.

FIG. 5 shows in perspective a cable splice enclosed by a liner encased in a disposable bag;

Figure 1:
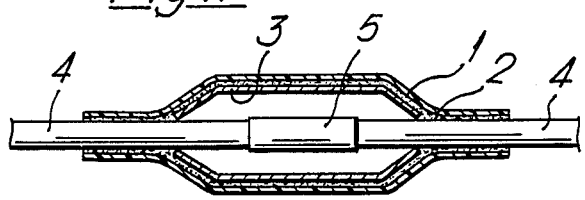
FIG. 1 shows a simple cable splice assembly.

In FIG. 1 a cable splice 5 is protected by a liner 3 and a recoverable sleeve 1. The sleeve 1 contains a layer of a hot-melt adhesive or other sealant 2 which seals to the liner when the sleeve 1 is heat-recovered or otherwise installed. This sealing prevents moisture wicking along the liner 3 and entering the splice 5 by passing around the ends of any moisture barrier layer in the liner 3. Such an arrangement would not be re-enterable without damaging the liner 3.

The other figures show ways of preventing bonding of the sleeve 1 to the liner 3, whilst maintaining a moisture barrier resistant to wicking.

Figure 2:
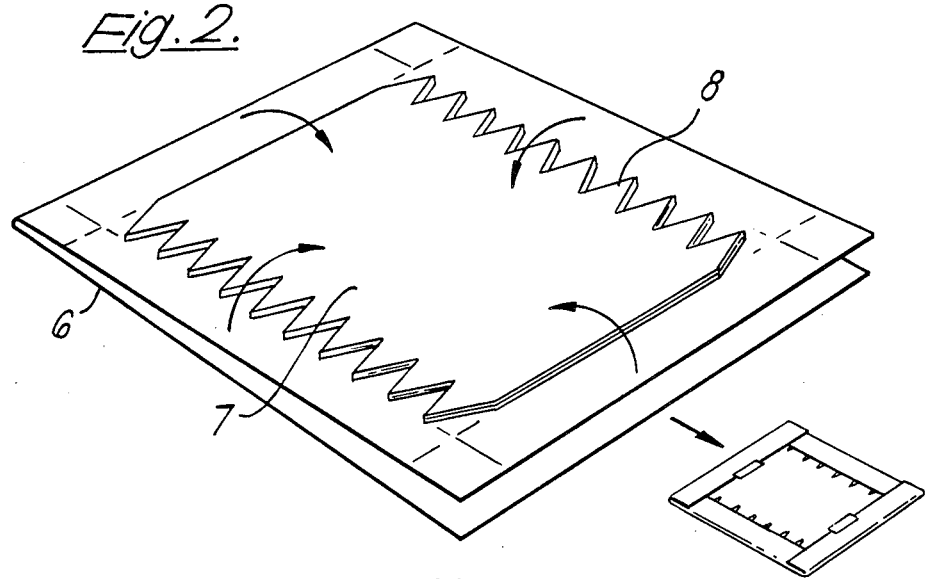
FIG. 2 shows the inside face of a liner and the use of a double layer of aluminium foil, and no adhesive, to allow separation of a liner and a sleeve.

In FIG. 2 a support 7 is used in conjunction with a folded double layer of aluminium foil 6 or other sheet material. The ends of the support 7 have tapered fingers which produce crowns 8 when the support 7 is rolled-up, to allow the support 7 to taper gradually down onto the cable 4 or other substrate to be protected. Taping may be required during assembly to hold the fingers down onto the cable 4; this will depend on the extra rigidity given to the support 7 by any foil 6 that it contains. The edges of the sheet 6 may be folded over the support 7 as shown in the inset. An advantage of this design is that it is very difficult for adhesive 2 on the outer sleeve 1 to stick to the tapered crown 8 of the support 7. Hence, removal of the sleeve 1 is very simple.

Figure 3A:
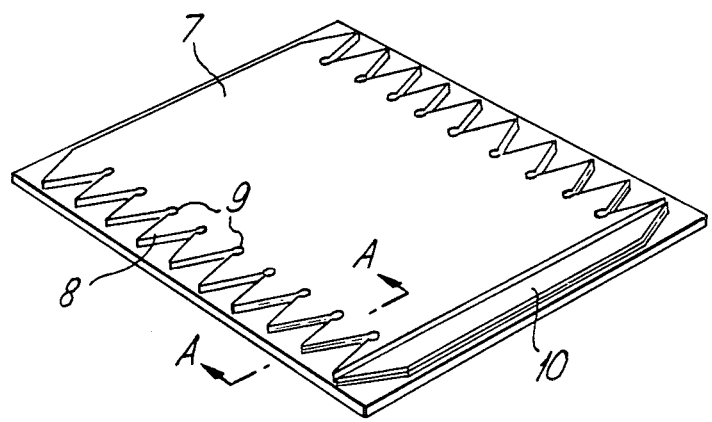
Figure 6A:
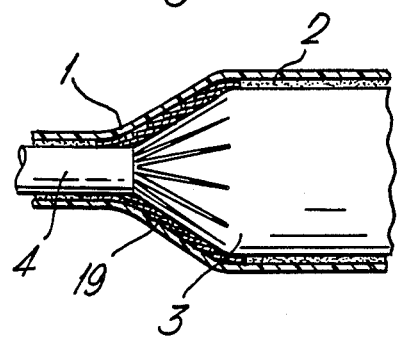
FIGS. 6A and 6B show end sections of splice cases using respectively separate support and disposable layer, and support inside a disposable bag.
Figure 6B:
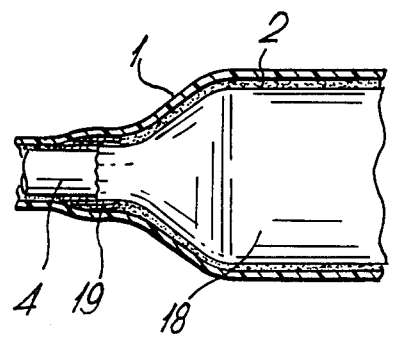

In FIGS. 3A and 3B the support 7 is shown as a laminate of polypropylene or cardboard 17, a pressure sensitive adhesive 16, a foam layer 15, further adhesive 14 and a release paper or plastic 13. FIG. 3B is a section viewed along A—A. There is also provided an aluminium foil moisture barrier 11 having a pressure sensitive adhesive 12. The release layer 13 allows removal of the outer sleeve 1 together with the foam and foil, or preferably (as illustrated) just with the foil 11. The support 7, in this embodiment, has a tear-off strip 10 which can be used to provide an adhesive strip to hold the liner in its rolled-up configuration, or which can provide a protective strip to separate the outer sleeve from an exposed edge of the support layer of the liner. Also, holes 9 are provided to aid bending of the crowns 8 and to avoid sharp points at the beginning of the tapered portion.

FIG. 4A shows a support 7 having an aluminium foil layer 6 only at its centre portion. This foil layer therefore provides only partly for release of an outer sleeve. Release from the tapered ends is possible, in this embodiment, because it is envisaged that tape would be used around the ends to hold the tapered fingers down onto the cable or other substrate 4. FIG. 4B shows a section viewed along A—A of FIG. 4A; the reference numbers have the same meaning as in FIG. 3B.

A preferred liner assembly is shown in FIGS. 5–8, where re-enterability is made possible by providing the major part of the liner (ie the support) inside a bag 18. When the splice is re-entered, the outer sleeve 1 is removed together with the layer 21 of the bag 18 which overlies the support proper 3. The liner 3 can then be removed, the splice 5 attended to, and the casing rebuilt by employing the old support 3 in a new bag 18. The old support 3 will not be damaged and not be contaminated by sealant 2 due to the barrier effected by the bag 18. The bag 18 is conveniently sealed on both sides, the fourth side optionally being sealed after insertion of the support. The bag may be manufactured as such, or may be made from two sheets welded together. Alternatively, an open bag 18 could be fashioned simply by wrapping material around the support.

An advantage of the support 3 being totally enclosed in a bag 18 is the continuous water-vapour and heat barriers that result. This means that it is not necessary to cover the whole of the liner with a tape such as a PSA-coated PVC, as is often required on prior art systems. When a tape is needed a short length to hold the crown against the cable will be sufficient; see tape 19 in FIG. 5. The improvement in water-vapour barrier can be gauged by comparing FIG. 6A, which requires a large amount of adhesive tape 19, and FIG. 6B where a bag 18 is used rendering unnecessary adhesive tape past the region of sleeve immediately adjacent the cable.

Figure 7:
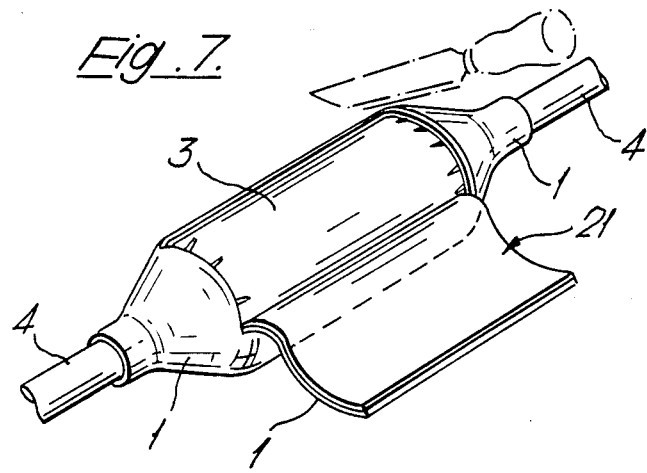
FIG. 7 shows in perspective a splice case being reentered.

In FIG. 7 a knife is used to cut the sleeve and outer layer 21 of the bag 20. The cutting is preferably done as two transverse rings, one at each transition of the splice case, and as a longitudinal slit joining these rings. This allows a central region of the splice case to be removed. The old support 3 can then be removed and, after attending to the repair, placed in a new bag 20, as shown in FIG. 8. The new support plus bag is then wrapped around the repaired splice and if need be is secured in position with a tape before a new recoverable sleeve is installed.

Figure 8A:
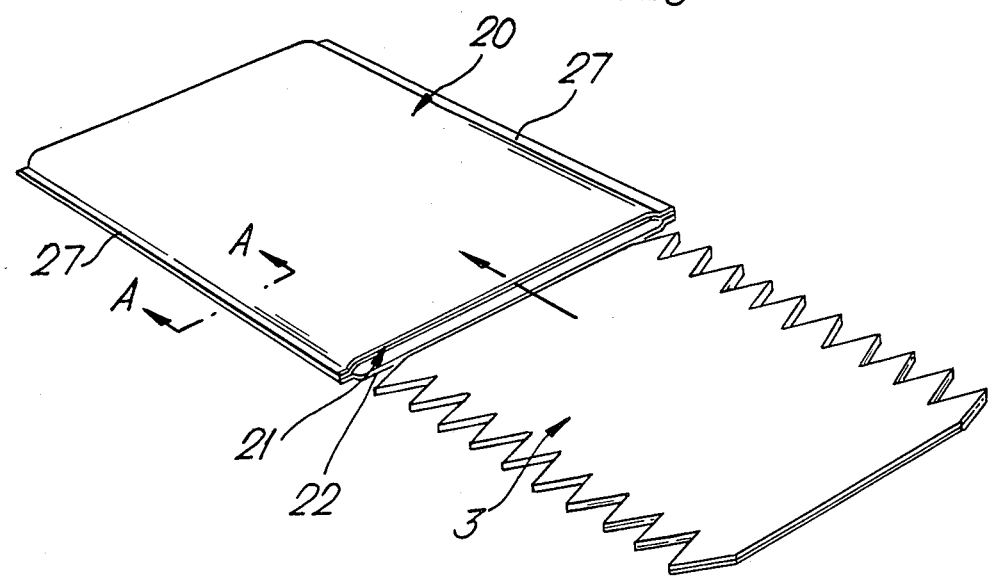
FIGS. 8A and 8B show a support about to be inserted into a bag for re-assembly of a splice case.
Figure 8B:
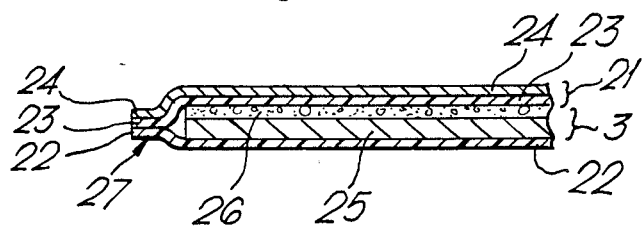

FIG. 8B is a section along A—A of FIG. 8A, and it shows a preferred construction of a support, inside a bag, the edge of the bag being welded at 27. The support is composed of two layers, a polypropylene or other support layer 25, and a heat barrier layer 26, which may be made of a foamed material such as a closed cell foamed polyethylene. The bag itself has an upper layer 21 and a lower layer 22 which will form respectively the outer and inner layers when the liner assembly is wrapped around the splice.

The upper (ie outer) layer 21 comprises an aluminium sheet 24 and a MYLAR (TM) sheet 23. These two layers are preferably laminated together, although they need not be. The lower (ie inner) layer 22 is preferably polyethylene. The thicknesses of these layers should be sufficient to resist the heat and mechanical stresses encountered during installation and use. An upper limit to thickness is generally determined by the need to re-enter and to achieve a smooth transition at the crown ends where a certain amount of crumpling will often occur. For some situations MYLAR (TM) may be found to be too stiff, and polyethylene may not have the desired heat resistance. In such circumstances the following arrangement may prove superior: a double upper layer of polyethylene and aluminium and a lower layer of polypropylene. In each of these embodiments, where the upper layer is a double layer, the plastics material is preferably on the outside and the metal sheet on the inside.

We claim:

1. A liner for internally supporting a recoverable sleeve in a closure assembly including an adhesive which seals the closure assembly upon recovery of the sleeve, the liner comprising a laminate of:
   (A) a re-usable support, the support accessible after a recovery of the recoverable sleeve by the removal of at least a portion of the sleeve and a disposable outer layer; and
   (B) a disposable outer layer, capable of fitting within a recoverable sleeve, held in position with respect to the support such that it is separable therefrom without damage to the support subsequent to re-covering the sleeve and melting the adhesive, the sleeve being disposed around the liner subsequent to the recovery of the sleeve.

2. A liner according to claim 1, wherein the support comprises a layer of substantially rigid material and a heat barrier layer.

3. A liner according to claim 2, wherein the substantially rigid material is a thermoplastics material and the heat barrier layer is a foamed polymeric material.

4. A liner according to claim 1 wherein the support has a crowned end which can be bent to allow the liner to accommodate a variation in size of a substrate to be enclosed.

5. A liner according to claim 1, wherein the disposable layer comprises a moisture vapour barrier.

6. A liner according to claim 5, wherein the moisture vapour barrier comprises a metal foil.

7. A liner according to any claim 1 or 5, wherein the disposable outer layer is held in said position by being bonded to the support via an intermediate release layer.

8. A liner according to claim 1 or 5, wherein the disposable outer layer is held in said position by being bonded to the support via an intermediate layer of low cohesive strength.

9. A liner according to claim 1 or 5, wherein the disposable outer layer is held in said position mechanically by enclosing at least a portion of the support.

10. A liner according to claim 9, wherein the disposable outer layer forms one face of a bag which contains the support.

11. A liner according to claim 10, wherein said one face of the bag is a laminate of a metal foil and a polyester, the other face of the bag being polyethylene.

12. A liner according to claim 10, wherein said one face of the bag is a laminate of a metal foil and polyethylene, the other face of the bag being polypropylene.

13. A bag suitable for use as part of a liner according to Claim 10, wherein one face is a laminate of a plastics sheet and a metal foil, and the other face is a plastic sheet.

14. A liner according to claim 1, further including a sleeve and wherein the adhesive comprises a hot-melt adhesive which melts and flows during the recovery of the sleeve, and wherein the hot-melt adhesive being secured to a surface of the sleeve adjacent to the liner.

* * * * *